US012568492B2

(12) United States Patent
Guo

(10) Patent No.: US 12,568,492 B2
(45) Date of Patent: Mar. 3, 2026

(54) CONTROL METHOD AND COMMUNICATION APPARATUS

(71) Applicant: Beijing Xiaomi Mobile Software Co., Ltd., Beijing (CN)

(72) Inventor: Shengxiang Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 322 days.

(21) Appl. No.: 18/555,281

(22) PCT Filed: Apr. 20, 2021

(86) PCT No.: PCT/CN2021/088406
§ 371 (c)(1),
(2) Date: Oct. 13, 2023

(87) PCT Pub. No.: WO2022/222032
PCT Pub. Date: Oct. 27, 2022

(65) Prior Publication Data
US 2024/0196394 A1      Jun. 13, 2024

(51) Int. Cl.
*H04W 72/1268*      (2023.01)
*H04W 52/36*      (2009.01)
*H04W 72/51*      (2023.01)

(52) U.S. Cl.
CPC ..... *H04W 72/1268* (2013.01); *H04W 52/365* (2013.01); *H04W 52/367* (2013.01); *H04W 72/51* (2023.01)

(58) Field of Classification Search
CPC ........... H04W 72/1268; H04W 52/365; H04W 52/367; H04W 72/51; H04W 52/00; H04W 52/02; H04W 52/146
See application file for complete search history.

(56) References Cited

U.S. PATENT DOCUMENTS

| | | | | |
|---|---|---|---|---|
| 2021/0297959 | A1* | 9/2021 | Zhou ..................... | H04W 52/42 |
| 2022/0295412 | A1* | 9/2022 | Hakola ................ | H04L 5/1469 |
| 2022/0330153 | A1* | 10/2022 | Hande ............... | H04W 52/0251 |

FOREIGN PATENT DOCUMENTS

| | | |
|---|---|---|
| CN | 109792747 A | 5/2019 |
| CN | 110267345 A | 9/2019 |
| CN | 111279758 A | 6/2020 |

(Continued)

OTHER PUBLICATIONS

Combined Chinese Office Action and Search Report issued on Apr. 30, 2024 in Chinese Patent Application No. 202180001038.9 (with English translation of Office Action), 12 pages.

(Continued)

*Primary Examiner* — Mohamed A Kamara
(74) *Attorney, Agent, or Firm* — Oblon, McClelland, Maier & Neustadt, L.L.P.

(57) ABSTRACT

A method for monitoring and control, applied to a terminal, the method including receiving indication information from a base station, where the indication information is used for indicating that the base station enables a target control policy, and the target control policy is that the base station controls an uplink resource of the terminal within a target time window according to maximum duty cycle capability information of the terminal and stopping monitoring an uplink duty cycle.

20 Claims, 9 Drawing Sheets

Receiving indication information from a base station, where the indication information is used for indicating that the base station enables a target control policy, and the target control policy is that the base station controls an uplink resource of the terminal within a target time window according to maximum duty cycle capability information of the terminal ~ S101

Stopping monitoring an uplink duty cycle ~ S102

(56) References Cited

FOREIGN PATENT DOCUMENTS

| | | |
|---|---|---|
| CN | 111726135 A | 9/2020 |
| WO | WO 2020/076965 A1 | 4/2020 |

OTHER PUBLICATIONS

International Search Report Issued Jan. 19, 2022, in PCT/CN2021/088406, filed on Apr. 20, 2021, with English Translation, therein, 4 pages.
VIVO. "Discussion on FR2 Maximum UL Duty Cycle" 3GPP TSG-RAN WG4 Meeting #90, R4-1904656. Apr. 12, 2019, 2 pages.
3GPP TS 38.101-1 V18.3.0 (Sep. 2023); 3rd Generation Partnership Project; Technical Specification Group Radio Access Network; NR; User Equipment (UE) radio transmission and reception; Part 1: Range 1 Standalone (Release 18), 818 pages.

* cited by examiner

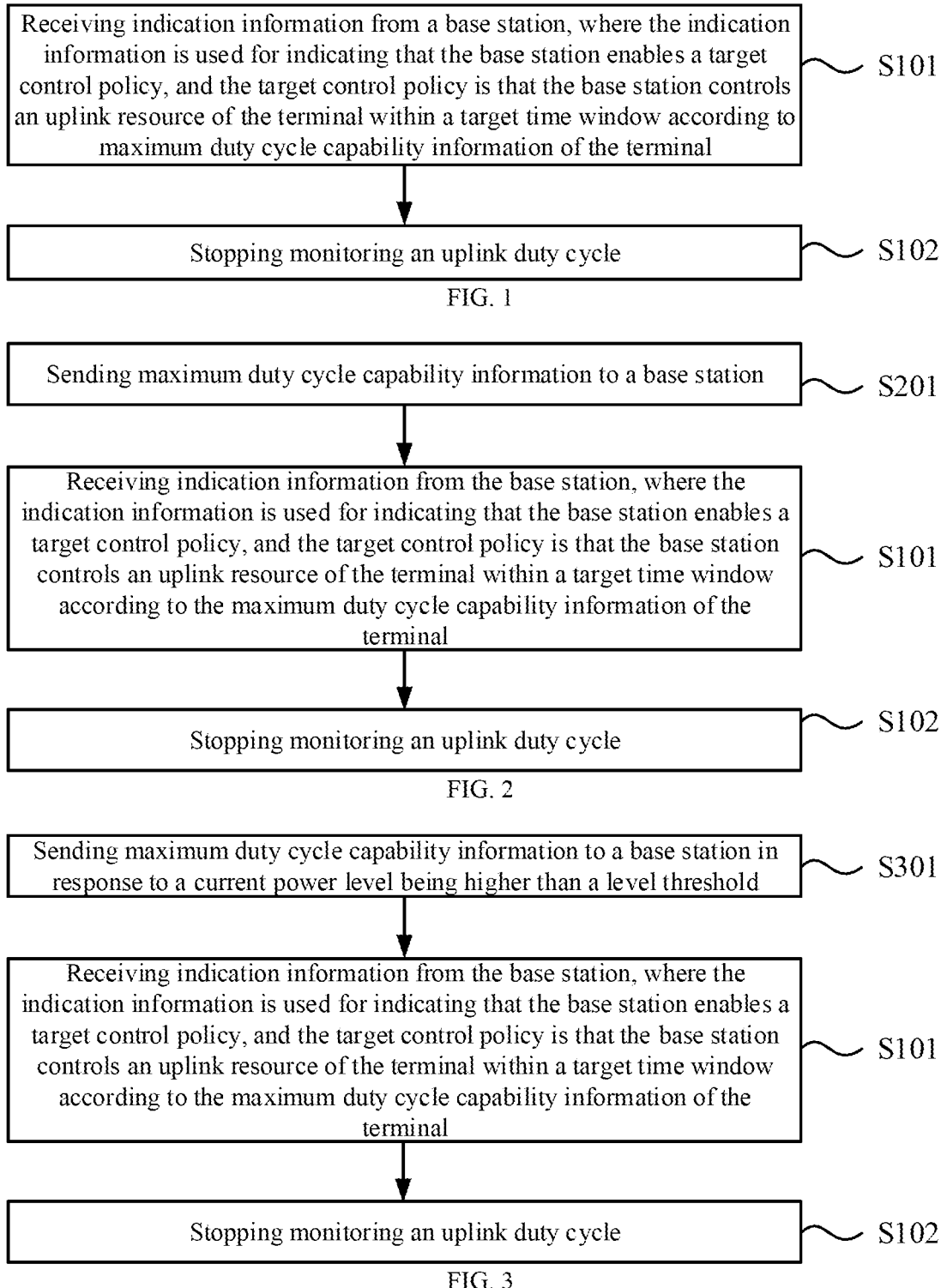

Receiving indication information from a base station, where the indication information is used for indicating that the base station enables a target control policy, and the target control policy is that the base station controls an uplink resource of the terminal within a target time window according to maximum duty cycle capability information of the terminal — S101

Stopping monitoring an uplink duty cycle — S102

FIG. 1

Sending maximum duty cycle capability information to a base station — S201

Receiving indication information from the base station, where the indication information is used for indicating that the base station enables a target control policy, and the target control policy is that the base station controls an uplink resource of the terminal within a target time window according to the maximum duty cycle capability information of the terminal — S101

Stopping monitoring an uplink duty cycle — S102

FIG. 2

Sending maximum duty cycle capability information to a base station in response to a current power level being higher than a level threshold — S301

Receiving indication information from the base station, where the indication information is used for indicating that the base station enables a target control policy, and the target control policy is that the base station controls an uplink resource of the terminal within a target time window according to the maximum duty cycle capability information of the terminal — S101

Stopping monitoring an uplink duty cycle — S102

FIG. 3

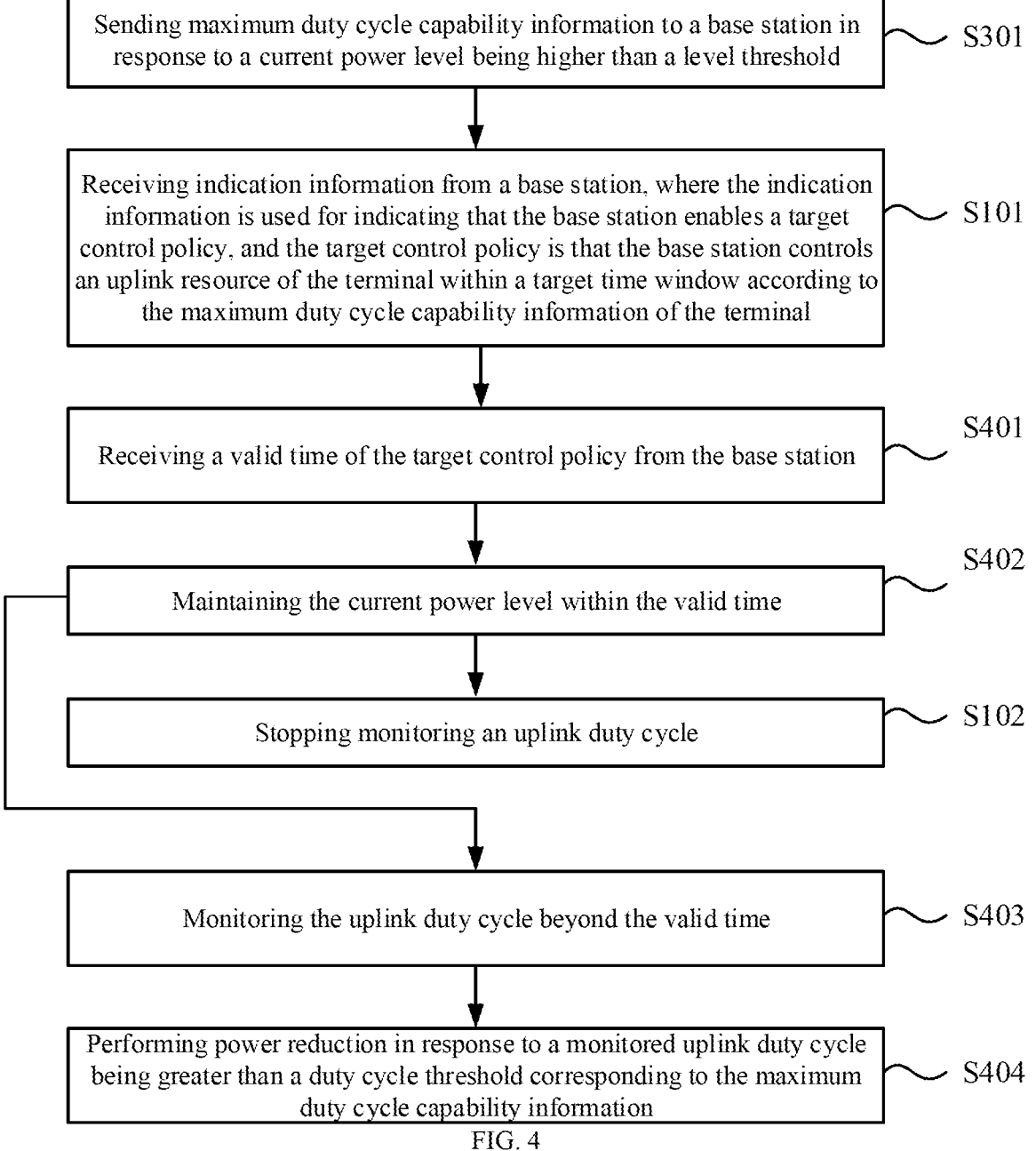

Sending maximum duty cycle capability information to a base station in response to a current power level being higher than a level threshold    S301

Receiving indication information from a base station, where the indication information is used for indicating that the base station enables a target control policy, and the target control policy is that the base station controls an uplink resource of the terminal within a target time window according to the maximum duty cycle capability information of the terminal    S101

Receiving a valid time of the target control policy from the base station    S401

Maintaining the current power level within the valid time    S402

Stopping monitoring an uplink duty cycle    S102

Monitoring the uplink duty cycle beyond the valid time    S403

Performing power reduction in response to a monitored uplink duty cycle being greater than a duty cycle threshold corresponding to the maximum duty cycle capability information    S404

FIG. 4

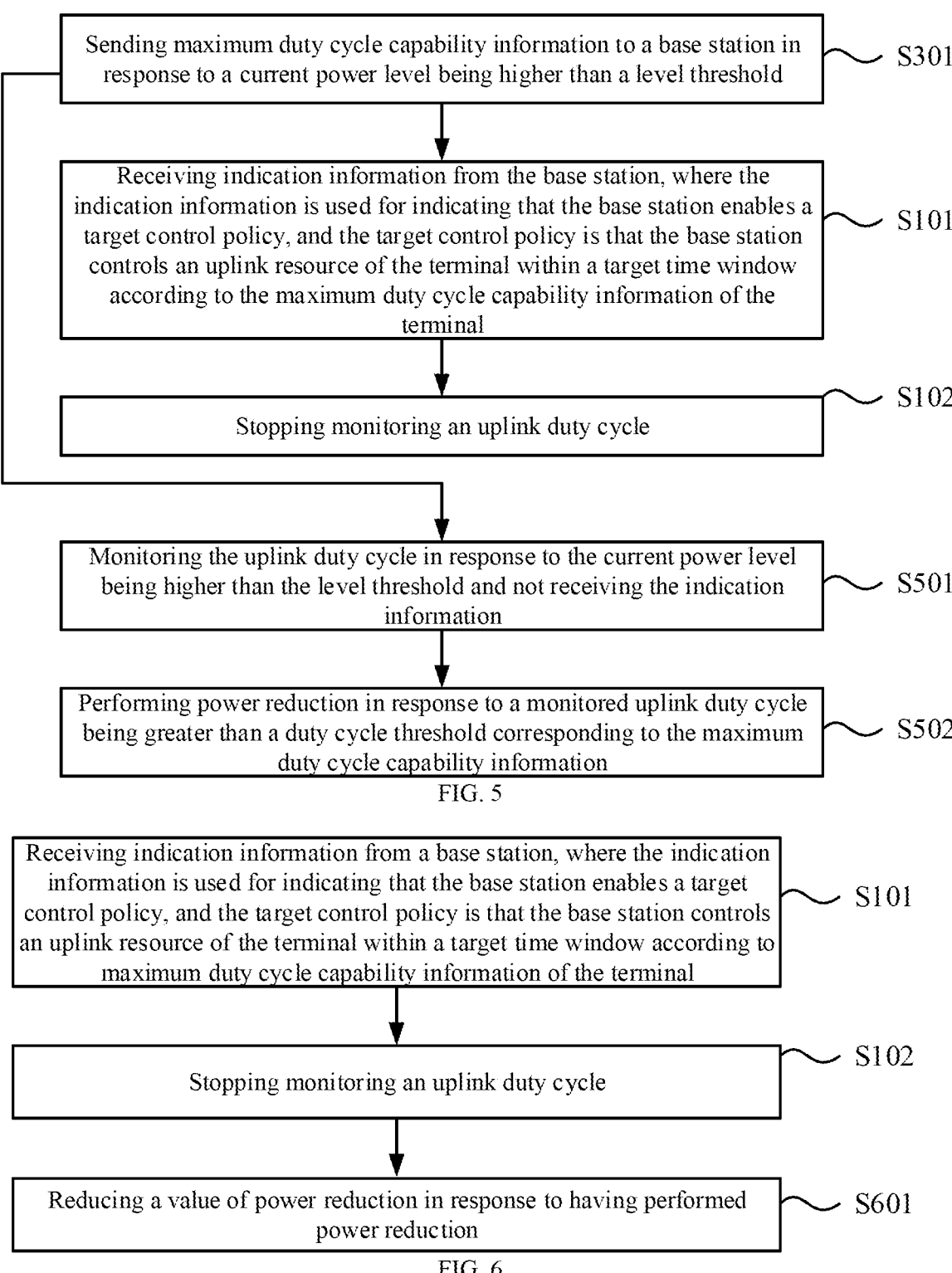

Sending maximum duty cycle capability information to a base station in response to a current power level being higher than a level threshold ⟿ S301

Receiving indication information from the base station, where the indication information is used for indicating that the base station enables a target control policy, and the target control policy is that the base station controls an uplink resource of the terminal within a target time window according to the maximum duty cycle capability information of the terminal ⟿ S101

Stopping monitoring an uplink duty cycle ⟿ S102

Monitoring the uplink duty cycle in response to the current power level being higher than the level threshold and not receiving the indication information ⟿ S501

Performing power reduction in response to a monitored uplink duty cycle being greater than a duty cycle threshold corresponding to the maximum duty cycle capability information ⟿ S502

FIG. 5

Receiving indication information from a base station, where the indication information is used for indicating that the base station enables a target control policy, and the target control policy is that the base station controls an uplink resource of the terminal within a target time window according to maximum duty cycle capability information of the terminal ⟿ S101

Stopping monitoring an uplink duty cycle ⟿ S102

Reducing a value of power reduction in response to having performed power reduction ⟿ S601

FIG. 6

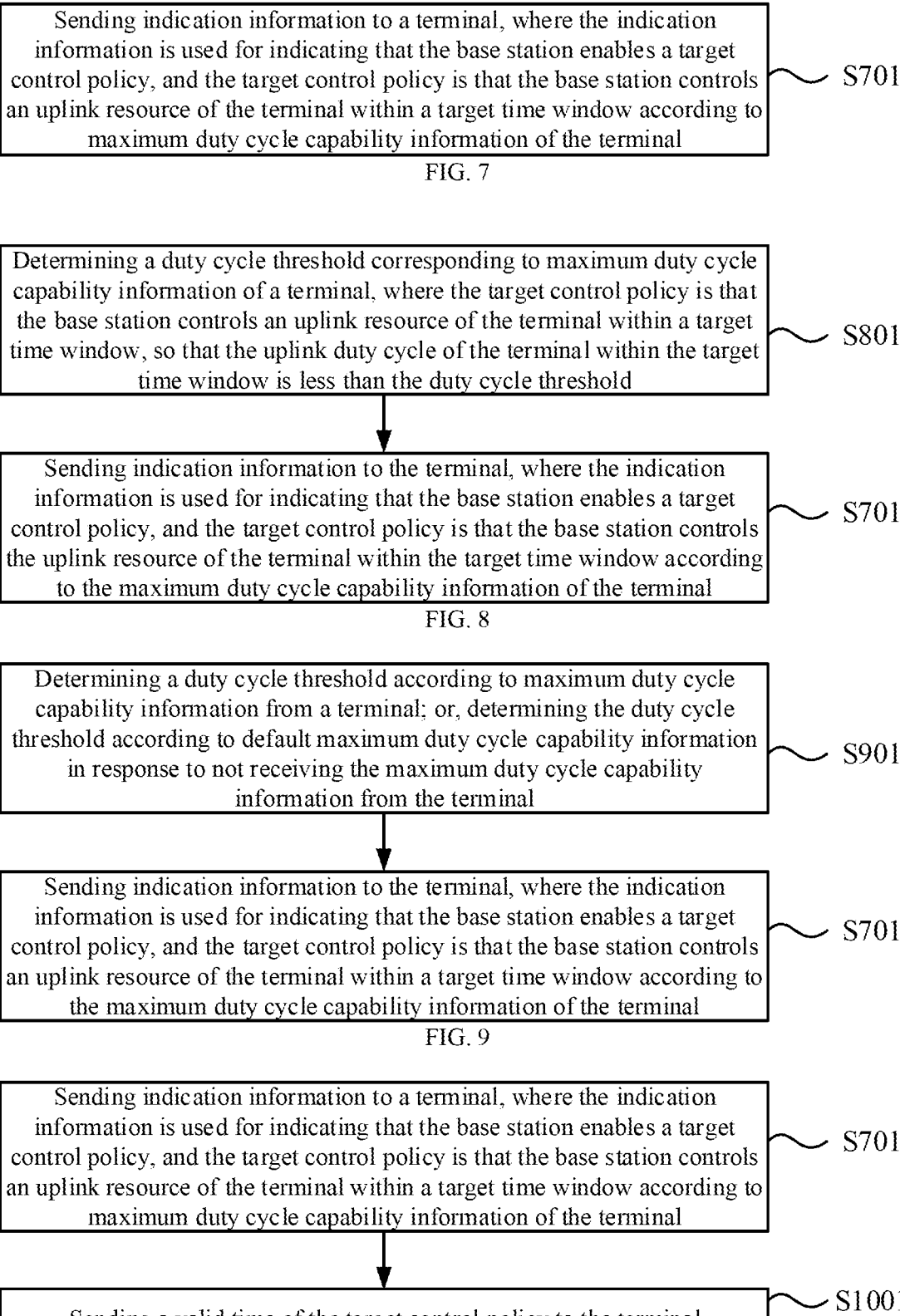

Sending indication information to a terminal, where the indication information is used for indicating that the base station enables a target control policy, and the target control policy is that the base station controls an uplink resource of the terminal within a target time window according to maximum duty cycle capability information of the terminal — S701

FIG. 7

Determining a duty cycle threshold corresponding to maximum duty cycle capability information of a terminal, where the target control policy is that the base station controls an uplink resource of the terminal within a target time window, so that the uplink duty cycle of the terminal within the target time window is less than the duty cycle threshold — S801

Sending indication information to the terminal, where the indication information is used for indicating that the base station enables a target control policy, and the target control policy is that the base station controls the uplink resource of the terminal within the target time window according to the maximum duty cycle capability information of the terminal — S701

FIG. 8

Determining a duty cycle threshold according to maximum duty cycle capability information from a terminal; or, determining the duty cycle threshold according to default maximum duty cycle capability information in response to not receiving the maximum duty cycle capability information from the terminal — S901

Sending indication information to the terminal, where the indication information is used for indicating that the base station enables a target control policy, and the target control policy is that the base station controls an uplink resource of the terminal within a target time window according to the maximum duty cycle capability information of the terminal — S701

FIG. 9

Sending indication information to a terminal, where the indication information is used for indicating that the base station enables a target control policy, and the target control policy is that the base station controls an uplink resource of the terminal within a target time window according to maximum duty cycle capability information of the terminal — S701

Sending a valid time of the target control policy to the terminal — S1001

FIG. 10

CONTROL METHOD AND COMMUNICATION APPARATUS

CROSS REFERENCE TO RELATED APPLICATION

The present application is a U.S. National Stage of International Application No. PCT/CN2021/088406, filed on Apr. 20, 2021, the contents of which are incorporated herein by reference in their entireties for all purposes.

BACKGROUND

Technical Field

The present disclosure relates to the field of communication technology, and in particular, to a method for monitoring and control, a method for control and indication, an apparatus for monitoring and control, an apparatus for control and indication, a communication apparatus, and a non-transitory computer-readable storage medium.

Description of the Related Art

The electromagnetic radiation of a mobile terminal device such as a mobile phone, a smart watch, a computer, or the like will affect human body safety. Especially along with the upcoming commercial use of 5G NR (New Radio), the terminal supporting high frequency band and high power will become the mainstream in the market, which also objectively increases the risk of the electromagnetic radiation of the terminal on human body safety.

The standard of electromagnetic radiation of the terminal on human body safety is represented by an electromagnetic wave absorption ratio or a specific absorption rate (SAR) and a maximum Permissible exposure (MPE); the former mainly aims at a low frequency band, such as a frequency band below 6 GHz, and the latter mainly aims at a millimeter wave frequency band.

SUMMARY

According to a first aspect of the embodiments of the present disclosure, there is provided a control method, performed by a terminal, and the method includes receiving indication information from a base station, where the indication information is used for indicating that the base station enables a target control policy, and the target control policy is that the base station controls an uplink resource of the terminal within a target time window according to maximum duty cycle capability information of the terminal, and stopping monitoring an uplink duty cycle.

According to a second aspect of the embodiments of the present disclosure, there is provided a control method, performed by a base station, and the method includes sending indication information to a terminal, where the indication information is used for indicating that the base station enables a target control policy, and the target control policy is that the base station controls an uplink resource of the terminal within a target time window according to maximum duty cycle capability information of the terminal.

According to a third aspect of the embodiments of the present disclosure, there is provided a communication apparatus, including a processor and a memory, configured to store with an executable instruction by the processor. The processor is configured to execute the above control method.

According to a fourth aspect of the embodiments of the present disclosure, there is provided a communication apparatus, including a processor and a memory, configured to store with an executable instruction by the processor. The processor is configured to execute the above control method.

BRIEF DESCRIPTION OF THE DRAWINGS

In order to more clearly illustrate the technical solutions in the embodiments of the present disclosure, the accompanying drawings that need to be used in the description of the embodiments are briefly described below. Obviously, the drawings in the following description are some embodiments of the present disclosure. For those of ordinary skill in the art, other drawings may also be obtained according to these drawings without creative effort.

FIG. 1 is a schematic flowchart of a method for monitoring and control illustrated according to some embodiments of the present disclosure.

FIG. 2 is a schematic flowchart of another method for monitoring and control illustrated according to some embodiments of the present disclosure.

FIG. 3 is a schematic flowchart of yet another method for monitoring and control illustrated according to some embodiments of the present disclosure.

FIG. 4 is a schematic flowchart of yet another method for monitoring and control illustrated according to some embodiments of the present disclosure.

FIG. 5 is a schematic flowchart of yet another method for monitoring and control illustrated according to some embodiments of the present disclosure.

FIG. 6 is a schematic flowchart of yet another method for monitoring and control illustrated according to some embodiments of the present disclosure.

FIG. 7 is a schematic flowchart of a method for control and indication illustrated according to some embodiments of the present disclosure.

FIG. 8 is a schematic flowchart of another method for control and indication illustrated according to some embodiments of the present disclosure.

FIG. 9 is a schematic flowchart of yet another method for control and indication illustrated according to some embodiments of the present disclosure.

FIG. 10 is a schematic flowchart of yet another method for control and indication illustrated according to some embodiments of the present disclosure.

DETAILED DESCRIPTION OF THE PREFERRED EMBODIMENTS

Figure 11:
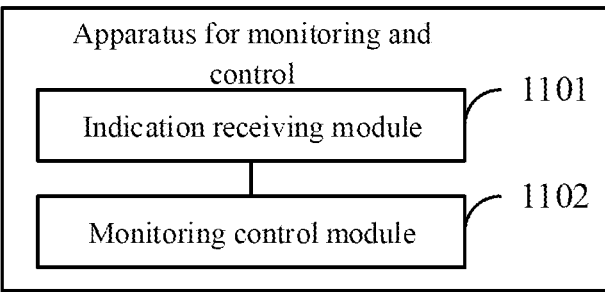
FIG. 11 is a schematic block diagram of an apparatus for monitoring and control illustrated according to some embodiments of the present disclosure.

The technical solutions in the embodiments of the present disclosure will be clearly and completely described below with reference to the accompanying drawings in the embodiments of the present disclosure. Obviously, the described embodiments are a part of the embodiments of the present disclosure, not all of the embodiments of the present disclosure. All other embodiments obtained by those of ordinary skill in the art without creative effort based on the embodiments of the present disclosure fall within the protection scope of the present disclosure.

The term used in the embodiments of the present disclosure is for the purpose of describing particular embodiments and is not intended to limit the embodiments of the present disclosure. As used in the embodiments of the present disclosure and the appended claims, the singular forms "a" and "the" are also intended to include plural forms, unless the context clearly indicates other meanings. It should also be understood that the term "and/or" as used in the context refers to and includes any or all possible combinations of one or more associated listed items.

It should be understood that although the terms "first", "second", "third", etc., may be used in the embodiments of the present disclosure to describe various information, the information should not be limited to these terms. These terms are used to distinguish the information of the same type from each other. For example, without departing from the scope of the embodiments of the present disclosure, the first information may also be referred to as second information; and similarly, the second information may also be referred to as first information. Depending on the context, the word "if" as used here may be interpreted as "at . . . time" or "when" or "in response to determining".

For purposes of brevity and ease of understanding, when representing a size relationship, the terms used here are "greater than" or "less than", "higher than" or "lower than". However, it can be understood by those skilled in the art that the term "greater than" also covers the meaning of "greater than or equal to", and "less than" also covers the meaning of "less than or equal to"; the term "higher than" covers the meaning of "higher than or equal to", and "lower than" also covers the meaning of "lower than or equal to".

In the related art, in order to reduce the effect of a signal transmitted by a terminal on human body safety, in a single frequency band, a certain power reduction is usually performed on the basis of a transmission power, or an uplink duty cycle (UL Dutycycle) transmitted by a terminal is reduced, so as to satisfy the requirements of SAR or MPE.

For example, at a high power level, the terminal may report maximum uplink duty cycle capability information (Maximum Dutycycle Capability); the base station may adjust the uplink and downlink configuration to ensure that the uplink duty cycle of the terminal is not greater than a duty cycle threshold corresponding to the capability information, and may inform the terminal of the adjusted uplink and downlink configuration, so that the terminal may directly determine the uplink duty cycle according to the uplink and downlink configuration without monitoring the uplink duty cycle by itself.

The above manner that the base station controls the uplink duty cycle of the terminal by adjusting the uplink and downlink configuration, is mainly applicable to the case of TDD (Time Division Duplexing), and there may be a certain problem for the case of FDD (Frequency Division Duplexing).

The reason is that, in an FDD communication scenario, communication may be performed on different frequency bands at the same moment; if it is directly configured as that there is no resource on a certain time domain unit, it will result in that there is no resource on all frequency bands corresponding to the time domain unit, which may bring problems. Therefore, the base station cannot control the duty cycle by directly adjusting the uplink and downlink configuration (for example, dynamic slot control, TDD-UL-DL-ConfigurationCommon adjustment, or TDD-UL-DL-ConfigDedicated adjustment), but can control the uplink duty cycle by controlling a specific uplink resource.

However, the terminal currently does not know when the base station has enabled such a policy for controlling the uplink duty cycle, so that the terminal needs to keep monitoring and calculate the uplink duty cycle all the time to determine whether the uplink duty cycle exceeds the duty cycle threshold corresponding to the maximum uplink duty cycle capability (Maximum Dutycycle Capability), which brings complexity and power consumption problems to the terminal.

In view of this, according to embodiments of the present disclosure, there is provided a method for monitoring and control, a method for control and indication, an apparatus for monitoring and control, an apparatus for control and indication, a communication apparatus, and a computer-readable storage medium, so as to solve the technical problems in the related art.

FIG. 1 is a schematic flowchart of a method for monitoring and control illustrated according to some embodiments of the present disclosure. The method for monitoring and control shown in this embodiment may be applied to a terminal. The terminal includes, but is not limited to, a communication apparatus such as a mobile phone, a tablet computer, a wearable device, a sensor, and an Internet of thing device. The terminal may be used as a user equipment (UE) to communicate with a base station. The base station includes, but is not limited to, a base station in a communication system such as a 4G base station, a 5G base station, and a 6G base station.

In some embodiments, the base station may be a base station that the method for control and indication according to any one of the following embodiments is applied to.

As shown in FIG. 1, the method for monitoring and control may include following steps.

In step S101, indication information from a base station is received, where the indication information is used for indicating that the base station enables a target control policy, and the target control policy is that the base station controls an uplink resource of the terminal within a target time window (which may also be referred to as an evaluation window) according to maximum duty cycle capability information of the terminal.

In step S02, monitoring an uplink duty cycle is stopped.

In some embodiments, the terminal may report at least one of following information to the base station: power headroom report (PHR), a configured maximum UE output power (PCMAX), or a maximum allowed UE output power reduction. The base station may determine whether to enable the target control policy based on at least one of the information.

For example, in the case of determining that the power headroom report of the terminal is less (e.g., less than a power headroom threshold), the target control policy may be enabled. Since the power headroom report of the terminal is smaller, it may be determined that the uplink transmission information required by the terminal is less, so that even if the target control policy is enabled to control the uplink duty cycle to be reduced, the uplink resource is reduced, and the terminal may also complete uplink transmission in a relatively shorter time.

For example, in the case that the configured maximum UE output power is greater (e.g., greater than an output power threshold), the target control policy may be enabled. Since the configured maximum UE output power of the terminal is greater, it can be determined that the output power used by the terminal is greater, which is more likely to cause electromagnetic radiation to affect the user, so that the target control policy may be enabled to control the uplink duty cycle to be reduced, so as to reduce the effect of electromagnetic radiation on the user.

For example, in the case that the maximum allowed UE output power reduction is greater (e.g., greater than a reduction power threshold), the target control policy may be enabled. Since the maximum allowed UE output power reduction of the terminal is greater, it can be determined that the terminal needs to perform a greater degree of power reduction, then the output power of the terminal should be relatively greater, which is more likely to cause electromagnetic radiation to affect the user, so that the target control policy may be enabled to control the uplink duty cycle to be reduced, so as to reduce the effect of electromagnetic radiation on the user.

It should be noted that, the base station may separately determine whether to enable the target control policy according to one of the above three pieces of information; the base station may also comprehensively determine whether to enable the target control policy based on two or three of the above three pieces of information; for example, the base station may perform weighted summation on the values of more than one piece of information, and determine whether to enable the target control policy according to the summation result.

In some embodiments, the base station enables the target control policy, which specifically refers to that the base station controls the uplink resource of the terminal within the target time window, so that the uplink duty cycle of the terminal within the target time window is less than the duty cycle threshold determined according to the maximum duty cycle capability information of the terminal.

Among them, the base station controls the uplink resource of the terminal, which may be an uplink resource for communication through FDD, or may be an uplink resource for communication through TDD. For example, for controlling the uplink resource for communication through FDD, certain frequency domain resources (e.g., carriers, component carriers, bandwidth parts, etc.) on certain time domain units (e.g., symbols, slots, subframes, etc.) may be specifically controlled to not perform uplink transmission, rather than that the uplink and downlink configuration is directly adjusted, and the uplink and downlink configuration information after enabling the target control policy will not be sent to the terminal.

In some embodiments, after enabling the target control policy, the base station may send indication information to the terminal to inform the terminal that the base station enables the target control policy. The base station may control the uplink resource of the terminal within the target time window, so as to ensure that the uplink duty cycle of the terminal does not exceed the duty cycle threshold corresponding to the maximum duty cycle capability information of the terminal within the target time window.

According to some embodiments of the present disclosure, after enabling the target control policy, the base station may send indication information to the terminal to inform the terminal that the base station enables the target control policy. Accordingly, the terminal may determine that the base station enables the target control policy, so that the uplink duty cycle of the terminal will not exceed the duty cycle threshold corresponding to the maximum duty cycle capability information of the terminal. Even if the terminal monitors the uplink duty cycle, the monitored uplink duty cycle will not exceed the duty cycle threshold corresponding to the maximum duty cycle capability information of the terminal; therefore, the terminal may stop monitoring (for example, may stop monitoring within a target time window) the uplink duty cycle, thus beneficial to saving resources of the terminal.

In some embodiments, the target time window may be pre-specified by a protocol, or may be configured by the base station for the terminal. For example, the target time window is a duration for a period of time at a specified starting point within each wireless frame, and then the specified starting point and the duration may be configured as needed, such as a duration of 10 milliseconds.

FIG. 2 is a schematic flowchart of another method for monitoring and control illustrated according to some embodiments of the present disclosure. As shown in FIG. 2, the method further includes following step.

In step S201, maximum duty cycle capability information is sent to the base station.

In some embodiments, the terminal may send its own maximum duty cycle capability information to the base station. The duty cycle threshold corresponding to the maximum duty cycle capability information is the maximum value of the uplink duty cycle allowed by the terminal. If the uplink duty cycle exceeds the threshold, it is possible to affect the user.

Correspondingly, the base station may determine a duty cycle threshold according to the maximum duty cycle capability information, and formulate a specific target control policy according to the determined duty cycle threshold; for example, the base station may configure the target control policy to be that the base station controls an uplink resource of the terminal within a target time window, so that the uplink duty cycle of the terminal within the target time window is less than the duty cycle threshold determined according to the maximum duty cycle capability information of the terminal.

It should be noted that, when the base station needs to specify the target control policy, and does not receive the maximum duty cycle capability information from the terminal, the base station may determine the duty cycle threshold according to default maximum duty cycle capability information. For example, the duty cycle threshold determined according to the default maximum duty cycle capability information may be 50%.

FIG. 3 is a schematic flowchart of yet another method for monitoring and control illustrated according to some embodiments of the present disclosure. As shown in FIG. 3, sending the maximum duty cycle capability information to the base station includes following step.

In step S301, in response to a current power level being higher than a level threshold, the maximum duty cycle capability information is sent to the base station.

In some embodiments, the terminal may send the maximum duty cycle capability information to the base station when its own current power level is higher (for example, higher than the level threshold).

When the current power level of the terminal is higher, for example, PC2 (26 dBm) or PC1.5 (29 dBm), the output power used by the terminal may be greater, which is more likely to cause electromagnetic radiation to affect the user; therefore, the terminal may send maximum duty cycle capability information to the base station, so that the base station can enable the target control policy to control the uplink duty cycle of the terminal not to exceed the duty cycle threshold, thus reducing the effect of electromagnetic radiation on the user.

When the current power level of the terminal is lower, for example, PC3, the output power used by the terminal may be smaller, which generally does not cause electromagnetic radiation to affect the user; therefore, the terminal does not need to send the maximum duty cycle capability information to the base station. Certainly, in this case, the terminal may also select to send the maximum duty cycle capability information to the base station, which may specifically be selected by the terminal according to its own needs.

FIG. 4 is a schematic flowchart of yet another method for monitoring and control illustrated according to some embodiments of the present disclosure. As shown in FIG. 4, the method further includes following steps.

In step S401, a valid time of the target control policy from the base station is received.

In step S402, the current power level is maintained within the valid time.

In step S403, an uplink duty cycle is monitored beyond the valid time.

In step S404, in response to a monitored uplink duty cycle being greater than a duty cycle threshold corresponding to the maximum duty cycle capability information, power reduction is performed.

In some embodiments, after formulating the target control policy, the base station may further determine a valid time of the target control policy, and then send the valid time to the terminal.

After receiving the valid time, the terminal may maintain the current power level within the valid time, for example, may maintain a power level higher than a level threshold. Since within the valid time, the base station may ensure that the uplink duty cycle of the terminal will not exceed the duty cycle threshold by enabling the target control policy so as to avoid the effect of electromagnetic radiation on the user, even if the transmission power of the terminal is higher, the target control policy of the terminal may still be implemented; therefore, the terminal may maintain the current power level within the valid time, which is beneficial to ensuring relatively better communication quality.

In some embodiments, the terminal may further stop monitoring the uplink duty cycle within the valid time; and, beyond the valid time, since the base station has stopped the target control policy, the uplink duty cycle may exceed the duty cycle threshold; therefore, the terminal continues to monitor the uplink duty cycle, and performs power reduction when the monitored uplink duty cycle is greater than the duty cycle threshold corresponding to the maximum duty cycle capability information, so as to ensure that electromagnetic radiation of the transmitted signal does not cause adverse effects on the user.

FIG. 5 is a schematic flowchart of yet another method for monitoring and control illustrated according to some embodiments of the present disclosure. As shown in FIG. 5, the method further includes following steps.

In step S501, in response to the current power level being higher than the level threshold and not receiving the indication information, the uplink duty cycle is monitored.

In step S502, in response to the monitored uplink duty cycle being greater than the duty cycle threshold corresponding to the maximum duty cycle capability information, power reduction is performed.

In some embodiments, when the current power level of the terminal is higher (for example, higher than the level threshold), if not receiving the indication information of the base station, the terminal can determine that the base station does not enable the target control policy to ensure that the uplink duty cycle of the terminal will not exceed the duty cycle threshold; therefore, the terminal needs to autonomously monitor the uplink duty cycle; when the monitored uplink duty cycle is greater than the duty cycle threshold corresponding to the maximum duty cycle capability information, the terminal needs to perform power reduction to ensure that electromagnetic radiation of the transmitted signal will not cause adverse effects on the user.

FIG. 6 is a schematic flowchart of yet another method for monitoring and control illustrated according to some embodiments of the present disclosure. As shown in FIG. 6, the method further includes following step.

In step S601, in response to having performed power reduction, a value of power reduction is reduced.

In some embodiments, in the case that the terminal has performed power reduction (for example, has performed power reduction according to the maximum allowed UE output power reduction), if receiving the indication information, the terminal can determine that the base station enables the target control policy. Since the terminal has performed power reduction, the effect of electromagnetic radiation of the transmitted signal on the user can be reduced to some extent. In addition, the base station enables the target control policy, which can also ensure that the electromagnetic radiation of the transmitted signal will not cause adverse effects on the user. Therefore, in this case, it is equivalent to that the policy of the base station side has been able to ensure that the electromagnetic radiation of the transmitted signal will not cause adverse effects on the user, so that the terminal side can properly reduce the value of power reduction, so as to ensure better communication quality.

FIG. 7 is a schematic flowchart of a method for control and indication illustrated according to some embodiments of the present disclosure. The method for control and indication shown in this embodiment may be applied to a base station. The base station includes, but is not limited to, a base station in a communication system such as a 4G base station, a 5G base station, and a 6G base station. The base station may communicate with a terminal used as a user equipment. The terminal includes, but is not limited to, a communication apparatus such as a mobile phone, a tablet computer, a wearable device, a sensor, and an Internet of thing device.

In some embodiments, the terminal may be a terminal that the method for monitoring and control according to any one of the above embodiments is applied to.

As shown in FIG. 7, the method for control and indication may include following steps.

In step S701, indication information is sent to a terminal, where the indication information is used for indicating that the base station enables a target control policy, and the target control policy is that the base station controls an uplink resource of the terminal within a target time window according to maximum duty cycle capability information of the terminal. For example, the indication information may occupy 1 bit. When the bit is 1, it indicates that the base station enables the target control policy; when the bit is 0, it indicates that the base station does not enable the target control policy.

In some embodiments, the base station may receive at least one of following from the terminal: a power headroom report, a configured maximum UE output power, or a maximum allowed UE output power reduction.

The base station may determine whether to enable the target control policy based on at least one of the information. For example, the target control policy is enabled in response to satisfying at least one of following: the power headroom report being less than a power headroom threshold; the configured maximum UE output power being greater than an output power threshold; or, the maximum allowed UE output power reduction being greater than a reduction power threshold.

For example, in the case of determining that the power headroom report of the terminal is less (e.g., less than a power headroom threshold), the target control policy may be enabled. Since the power headroom report of the terminal is smaller, it may be determined that the uplink transmission information required by the terminal is less, so that even if the target control policy is enabled to control the uplink duty cycle to be reduced, the uplink resource is reduced, and the terminal may also complete uplink transmission in a relatively shorter time.

For example, in the case that the configured maximum UE output power is greater (e.g., greater than an output power threshold), the target control policy may be enabled. Since the configured maximum UE output power of the terminal is greater, it can be determined that the output power used by the terminal is greater, which is more likely to cause electromagnetic radiation to affect the user, so that the target control policy may be enabled to control the uplink duty cycle to be reduced, so as to reduce the effect of electromagnetic radiation on the user.

For example, in the case that the maximum allowed UE output power reduction is greater (e.g., greater than a reduction power threshold), the target control policy may be enabled. Since the maximum allowed UE output power reduction of the terminal is greater, it can be determined that the terminal needs to perform a greater degree of power reduction, then the output power of the terminal should be relatively greater, which is more likely to cause electromagnetic radiation to affect the user, so that the target control policy may be enabled to control the uplink duty cycle to be reduced, so as to reduce the effect of electromagnetic radiation on the user.

It should be noted that, the base station may separately determine whether to enable the target control policy according to one of the above three pieces of information;

the base station may also comprehensively determine whether to enable the target control policy based on two or three of the above three pieces of information; for example, the base station may perform weighted summation on the values of more than one piece of information, and determine whether to enable the target control policy according to the summation result.

In some embodiments, the base station enables the target control policy, which specifically refers to that the base station controls the uplink resource of the terminal within the target time window, so that the uplink duty cycle of the terminal within the target time window is less than the duty cycle threshold determined according to the maximum duty cycle capability information of the terminal.

Among them, the base station controls the uplink resource of the terminal, which may be an uplink resource for communication through FDD, or may be an uplink resource for communication through TDD. For example, for controlling the uplink resource for communication through FDD, certain frequency domain resources (e.g., carriers, component carriers, bandwidth parts, etc.) on certain time domain units (e.g., symbols, slots, subframes, etc.) may be specifically controlled to not perform uplink transmission, rather than that the uplink and downlink configuration is directly adjusted, and the uplink and downlink configuration information after enabling the target control policy will not be sent to the terminal.

In some embodiments, after enabling the target control policy, the base station may send indication information to the terminal to inform the terminal that the base station enables the target control policy. The base station may control the uplink resource of the terminal within the target time window, so as to ensure that the uplink duty cycle of the terminal does not exceed the duty cycle threshold corresponding to the maximum duty cycle capability information of the terminal within the target time window.

According to some embodiments of the present disclosure, after enabling the target control policy, the base station may send indication information to the terminal to inform the terminal that the base station enables the target control policy. Accordingly, the terminal may determine that the base station enables the target control policy, so that the uplink duty cycle of the terminal will not exceed the duty cycle threshold corresponding to the maximum duty cycle capability information of the terminal. Even if the terminal monitors the uplink duty cycle, the monitored uplink duty cycle will not exceed the duty cycle threshold corresponding to the maximum duty cycle capability information of the terminal; therefore, the terminal may stop monitoring (for example, may stop monitoring within a target time window) the uplink duty cycle, thus beneficial to saving resources of the terminal.

In some embodiments, the target time window may be pre-specified by a protocol, or may be configured by the base station for the terminal. For example, the target time window is a duration for a period of time at a specified starting point within each wireless frame, and then the specified starting point and the duration may be configured as needed, such as a duration of 10 milliseconds.

FIG. 8 is a schematic flowchart of another method for control and indication illustrated according to some embodiments of the present disclosure. As shown in FIG. 8, the method further includes following step.

In step S801, a duty cycle threshold corresponding to maximum duty cycle capability information of the terminal is determined, where the target control policy is that the base station controls an uplink resource of the terminal within a target time window, so that an uplink duty cycle of the terminal within the target time window is less than the duty cycle threshold.

In some embodiments, the base station may determine the duty cycle threshold corresponding to the maximum duty cycle capability information of the terminal, and may further formulate a specific target control policy according to the determined duty cycle threshold; for example, the base station may configure the target control policy to be that the base station controls an uplink resource of the terminal within a target time window, so that the uplink duty cycle of the terminal within the target time window is less than the duty cycle threshold determined according to the maximum duty cycle capability information of the terminal.

FIG. 9 is a schematic flowchart of yet another method for control and indication illustrated according to some embodiments of the present disclosure. As shown in FIG. 9, determining the duty cycle threshold corresponding to the maximum duty cycle capability information of the terminal includes following step.

In step S901, the duty cycle threshold is determined according to the maximum duty cycle capability information from the terminal; or, in response to not receiving the maximum duty cycle capability information from the terminal, the duty cycle threshold is determined according to default maximum duty cycle capability information.

In some embodiments, the terminal may send its own maximum duty cycle capability information to the base station. The duty cycle threshold corresponding to the maximum duty cycle capability information is the maximum value of the uplink duty cycle allowed by the terminal. If the uplink duty cycle exceeds the threshold, it is possible to affect the user.

Alternatively, when the base station does not receive the maximum duty cycle capability information from the terminal, if it is needed to determine the target control policy according to the duty cycle threshold, the base station may determine the duty cycle threshold according to default maximum duty cycle capability information. For example, the duty cycle threshold determined according to the default maximum duty cycle capability information may be 50%.

FIG. 10 is a schematic flowchart of yet another method for control and indication illustrated according to some embodiments of the present disclosure. As shown in FIG. 10, the method further includes following step.

In step S1001, a valid time of the target control policy is sent to the terminal.

In some embodiments, after formulating the target control policy, the base station may further determine a valid time of the target control policy, and then send the valid time to the terminal.

After receiving the valid time, the terminal may maintain the current power level within the valid time, for example, may maintain a power level higher than a level threshold. Since within the valid time, the base station may ensure that the uplink duty cycle of the terminal will not exceed the duty cycle threshold by enabling the target control policy so as to avoid the effect of electromagnetic radiation on the user, even if the transmission power of the terminal is higher, the target control policy of the terminal may still be implemented; therefore, the terminal may maintain the current power level within the valid time, which is beneficial to ensuring relatively better communication quality.

In some embodiments, the terminal may further stop monitoring the uplink duty cycle within the valid time; and, beyond the valid time, since the base station has stopped the target control policy, the uplink duty cycle may exceed the duty cycle threshold; therefore, the terminal continues to monitor the uplink duty cycle, and performs power reduction when the monitored uplink duty cycle is greater than the duty cycle threshold corresponding to the maximum duty cycle capability information, so as to ensure that electromagnetic radiation of the transmitted signal does not cause adverse effects on the user.

Corresponding to the foregoing embodiments of the method for monitoring and control and the method for control and indication, the present disclosure further provides embodiments of an apparatus for monitoring and control and an apparatus for control and indication.

FIG. 11 is a schematic block diagram of an apparatus for monitoring and control illustrated according to some embodiments of the present disclosure. The apparatus for monitoring and control shown in this embodiment may be applied to a terminal. The terminal includes, but is not limited to, a communication apparatus such as a mobile phone, a tablet computer, a wearable device, a sensor, and an Internet of thing device. The terminal may be used as a user equipment (UE) to communicate with a base station. The base station includes, but is not limited to, a base station in a communication system such as a 4G base station, a 5G base station, and a 6G base station.

As shown in FIG. 11, the apparatus for monitoring and control may include an indication receiving module 1101 and a monitoring control module 1102.

The indication receiving module 1101 is configured to receive indication information from a base station, where the indication information is used for indicating that the base station enables a target control policy, and the target control policy is that the base station controls an uplink resource of the terminal within a target time window according to maximum duty cycle capability information of the terminal.

The monitoring control module 1102 is configured to stop monitoring an uplink duty cycle.

Figure 12:
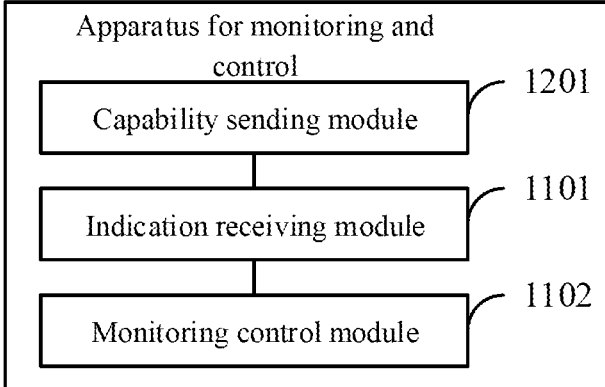
FIG. 12 is a schematic block diagram of another apparatus for monitoring and control illustrated according to some embodiments of the present disclosure.

FIG. 12 is a schematic block diagram of another apparatus for monitoring and control illustrated according to some embodiments of the present disclosure. As shown in FIG. 12, the apparatus further includes a capability sending module 1201 configured to send maximum duty cycle capability information to the base station.

In some embodiments, the capability sending module is configured to send maximum duty cycle capability information to the base station in response to a current power level being higher than a level threshold.

Figure 13:
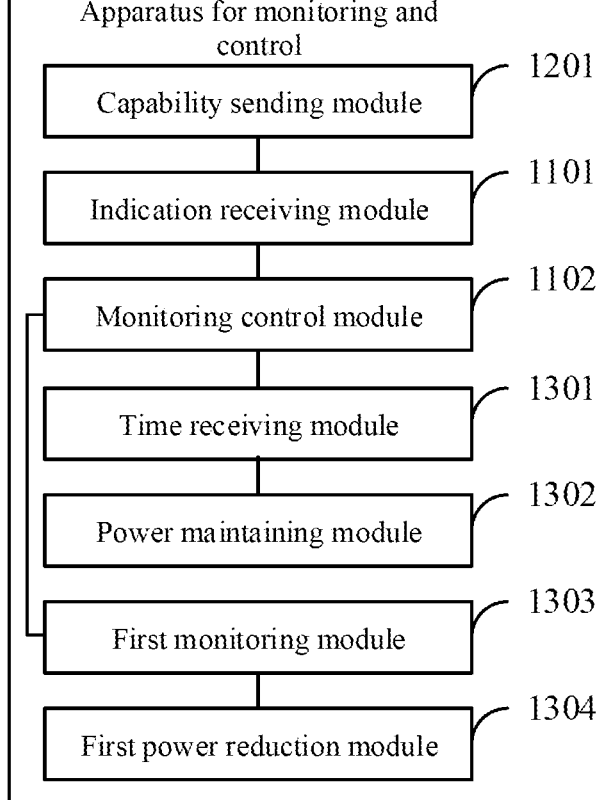
FIG. 13 is a schematic block diagram of yet another apparatus for monitoring and control illustrated according to some embodiments of the present disclosure.

FIG. 13 is a schematic block diagram of yet another apparatus for monitoring and control illustrated according to some embodiments of the present disclosure. As shown in FIG. 13, the apparatus further includes: a time receiving module 1301, configured to receive a valid time of the target control policy from the base station; a power maintaining module 1302, configured to maintain the current power level within the valid time; a first monitoring module 1303, configured to monitor the uplink duty cycle beyond the valid time; and, a first power reduction module 1304, configured to perform power reduction in response to the monitored uplink duty cycle being greater than a duty cycle threshold corresponding to the maximum duty cycle capability information.

Figure 14:
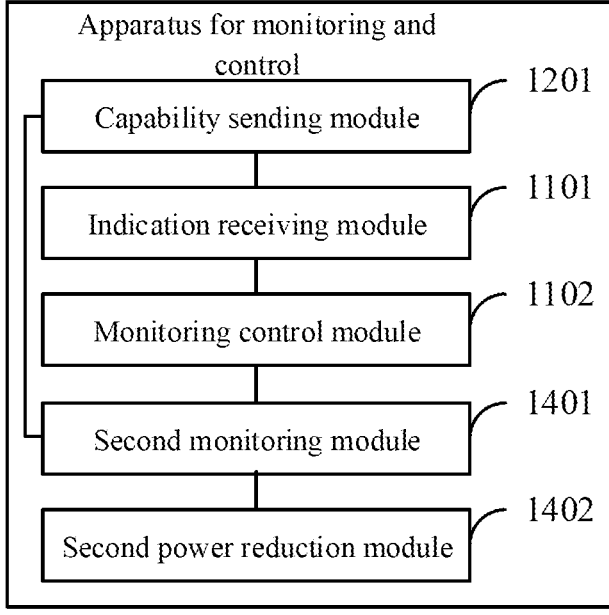
FIG. 14 is a schematic block diagram of yet another apparatus for monitoring and control illustrated according to some embodiments of the present disclosure.

FIG. 14 is a schematic block diagram of yet another apparatus for monitoring and control illustrated according to some embodiments of the present disclosure. As shown in FIG. 14, the apparatus further includes: a second monitoring module 1401, configured to monitor the uplink duty cycle in response to a current power level being higher than a level threshold and not receiving the indication information; and, a second power reduction module 1402, configured to perform power reduction in response to the monitored uplink duty cycle being greater than a duty cycle threshold corresponding to the maximum duty cycle capability information.

Figure 15:
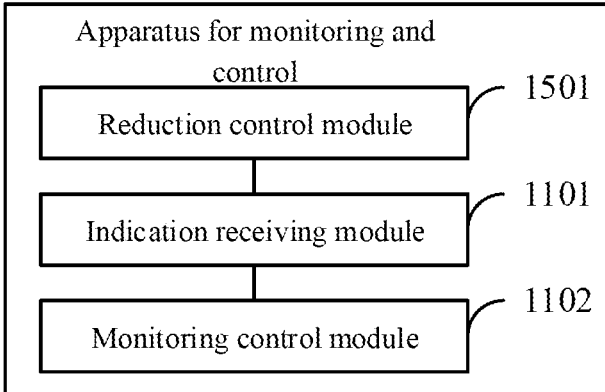
FIG. 15 is a schematic block diagram of yet another apparatus for monitoring and control illustrated according to some embodiments of the present disclosure.

FIG. 15 is a schematic block diagram of yet another apparatus for monitoring and control illustrated according to some embodiments of the present disclosure. As shown in FIG. 15, the apparatus further includes a reduction control module 1501 configured to reduce a value of power reduction in response to having performed power reduction.

Figure 16:
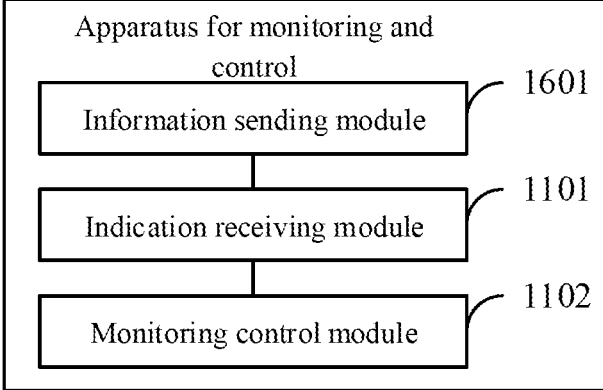
FIG. 16 is a schematic block diagram of yet another apparatus for monitoring and control illustrated according to some embodiments of the present disclosure.

FIG. 16 is a schematic block diagram of yet another apparatus for monitoring and control illustrated according to some embodiments of the present disclosure. As shown in FIG. 16, the apparatus further includes an information sending module 1601 configured to send at least one of following to the base station: a power headroom report, a configured maximum UE output power, or a maximum allowed UE output power reduction.

Figure 17:
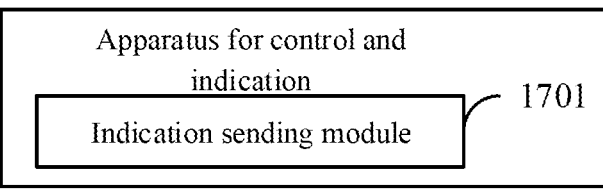
FIG. 17 is a schematic block diagram of an apparatus for control and indication illustrated according to some embodiments of the present disclosure.

FIG. 17 is a schematic block diagram of an apparatus for control and indication illustrated according to some embodiments of the present disclosure. The apparatus for control and indication shown in this embodiment may be applied to a base station. The base station includes, but is not limited to, a base station in a communication system such as a 4G base station, a 5G base station, and a 6G base station. The base station may communicate with a terminal used as a user equipment. The terminal includes, but is not limited to, a communication apparatus such as a mobile phone, a tablet computer, a wearable device, a sensor, and an Internet of thing device.

As shown in FIG. 17, the apparatus for control and indication may include an indication sending module 1701.

The indication sending module 1701 is configured to send indication information to a terminal, where the indication information is used for indicating that the base station enables a target control policy, and the target control policy is that the base station controls an uplink resource of the terminal within a target time window according to maximum duty cycle capability information of the terminal.

Figure 18:
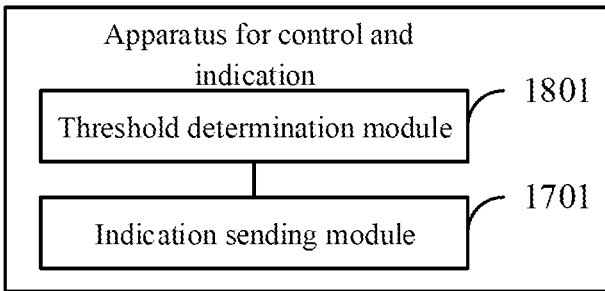
FIG. 18 is a schematic block diagram of another apparatus for control and indication illustrated according to some embodiments of the present disclosure.

FIG. 18 is a schematic block diagram of another apparatus for control and indication illustrated according to some embodiments of the present disclosure. As shown in FIG. 18, the apparatus further includes a threshold determination module 1801.

The threshold determination module 1801 is configured to determine a duty cycle threshold corresponding to maximum duty cycle capability information of the terminal, where the target control policy is that the base station controls an uplink resource of the terminal within a target time window, so that an uplink duty cycle of the terminal within the target time window is less than the duty cycle threshold.

In some embodiments, the threshold determination module is configured to: determine the duty cycle threshold according to the maximum duty cycle capability information from the terminal; or, determine the duty cycle threshold according to default maximum duty cycle capability information in response to not receiving the maximum duty cycle capability information from the terminal.

Figure 19:
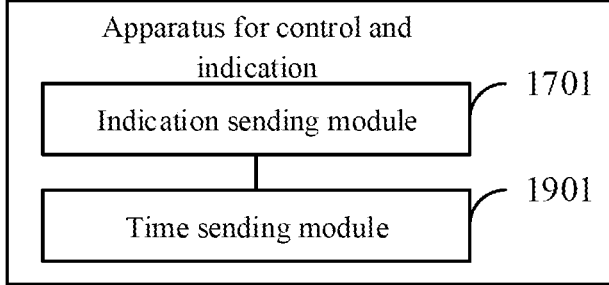
FIG. 19 is a schematic block diagram of yet another apparatus for control and indication illustrated according to some embodiments of the present disclosure.

FIG. 19 is a schematic block diagram of yet another apparatus for control and indication according to some embodiments of the present disclosure. As shown in FIG. 19, the apparatus further includes a time sending module 1901.

The time sending module 1901 is configured to send a valid time of the target control policy to the terminal.

Figure 20:
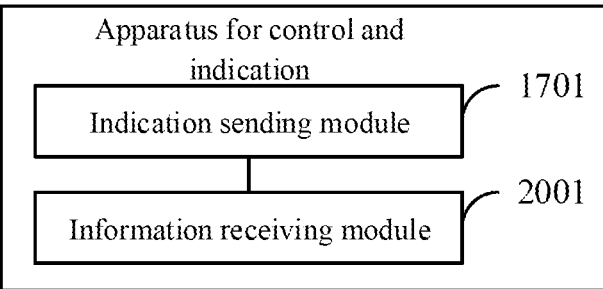
FIG. 20 is a schematic block diagram of yet another apparatus for control and indication illustrated according to some embodiments of the present disclosure.

FIG. 20 is a schematic block diagram of yet another apparatus for control and indication illustrated according to some embodiments of the present disclosure. As shown in FIG. 20, the apparatus further includes an information receiving module 2001.

The information receiving module 2001 is configured to receive at least one of following from the terminal: a power headroom report, a configured maximum UE output power, or a maximum allowed UE output power reduction.

Figure 21:
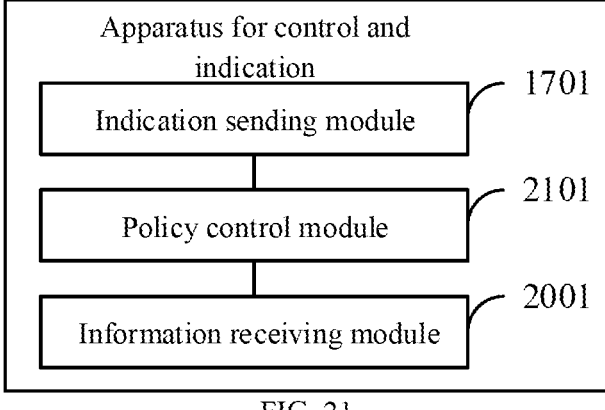
FIG. 21 is a schematic block diagram of yet another apparatus for control and indication illustrated according to some embodiments of the present disclosure.

FIG. 21 is a schematic block diagram of yet another apparatus for control and indication illustrated according to some embodiments of the present disclosure. As shown in FIG. 21, the apparatus further includes a policy control module 2101.

The policy control module 2101 is configured to enable the target control policy in response to satisfying at least one of following: the power headroom report being less than a power headroom threshold; the configured maximum UE output power being greater than an output power threshold; or, the maximum allowed UE output power reduction being greater than a reduction power threshold.

With regard to the apparatus in the above embodiments, the specific manner in which each module performs an operation has been described in detail in the embodiments of the related method, which will not be described in detail here.

For the embodiments of the apparatus, since they basically correspond to the method embodiments, the related part may be referred to the description of the method embodiments. The apparatus embodiments described above are illustrative, where the modules described as separate components may or may not be physically separate; components displayed as modules may or may not be physical modules, that is, may be located in one place, or may also be distributed to more than one network modules. Some or all of the modules may be selected according to actual needs to achieve the objectives of the solutions of the embodiments. Those of ordinary skill in the art may understand and implement the foregoing without creative effort.

According to some embodiments of the present disclosure, there is further provided a communication apparatus, including a processor and a memory, configured to store with a computer program. When the computer program is executed by the processor, the method for monitoring and control according to any one of the above embodiments is implemented.

According to some embodiments of the present disclosure, there is further provided a communication apparatus, including a processor and a memory, configured to store with a computer program. When the computer program is executed by the processor, the method for control and indication described in any one of the above embodiments is implemented.

According to some embodiments of the present disclosure, there is further provided a computer readable storage medium, configured to store with a computer program; when the computer program is executed by a processor, steps in the method for monitoring and control according to any one of the above embodiments are implemented.

According to some embodiments of the present disclosure, there is further provided a computer readable storage medium, configured to store with a computer program; when the computer program is executed by a processor, steps in the method for control and indication according to any one of the foregoing embodiments are implemented.

Figure 22:
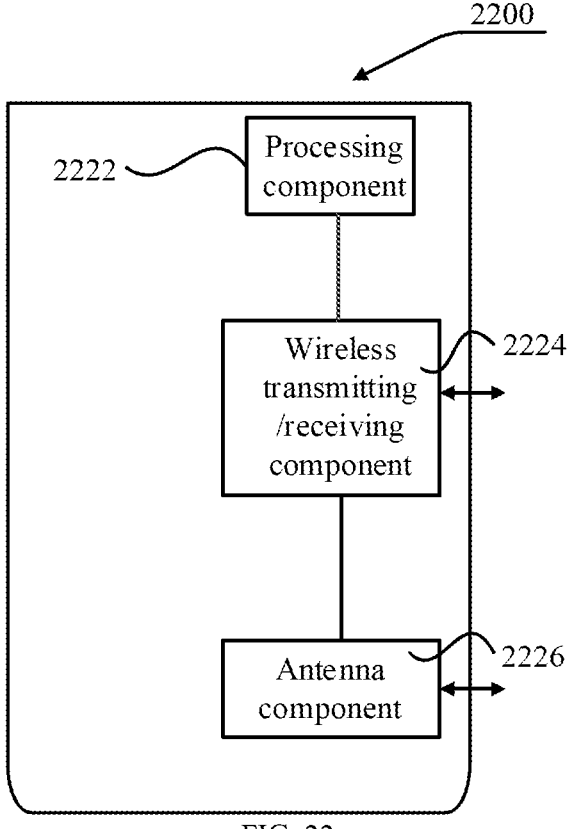
FIG. 22 is a schematic block diagram of an apparatus for control and indication illustrated according to some embodiments of the present disclosure.

As shown in FIG. 22, FIG. 22 is a schematic block diagram of an apparatus 2200 for control and indication according to some embodiments of the present disclosure. The apparatus 2200 may be provided as a base station.

Referring to FIG. 22, the apparatus 2200 includes a processing component 2222, a wireless transmitting/receiving component 2224, an antenna component 2226, and a signal processing portion unique to a wireless interface. The processing component 2222 may further include one or more processors. One of the processors 2222 may be configured to implement the method for control and indication according to any one of the foregoing embodiments.

Figure 23:
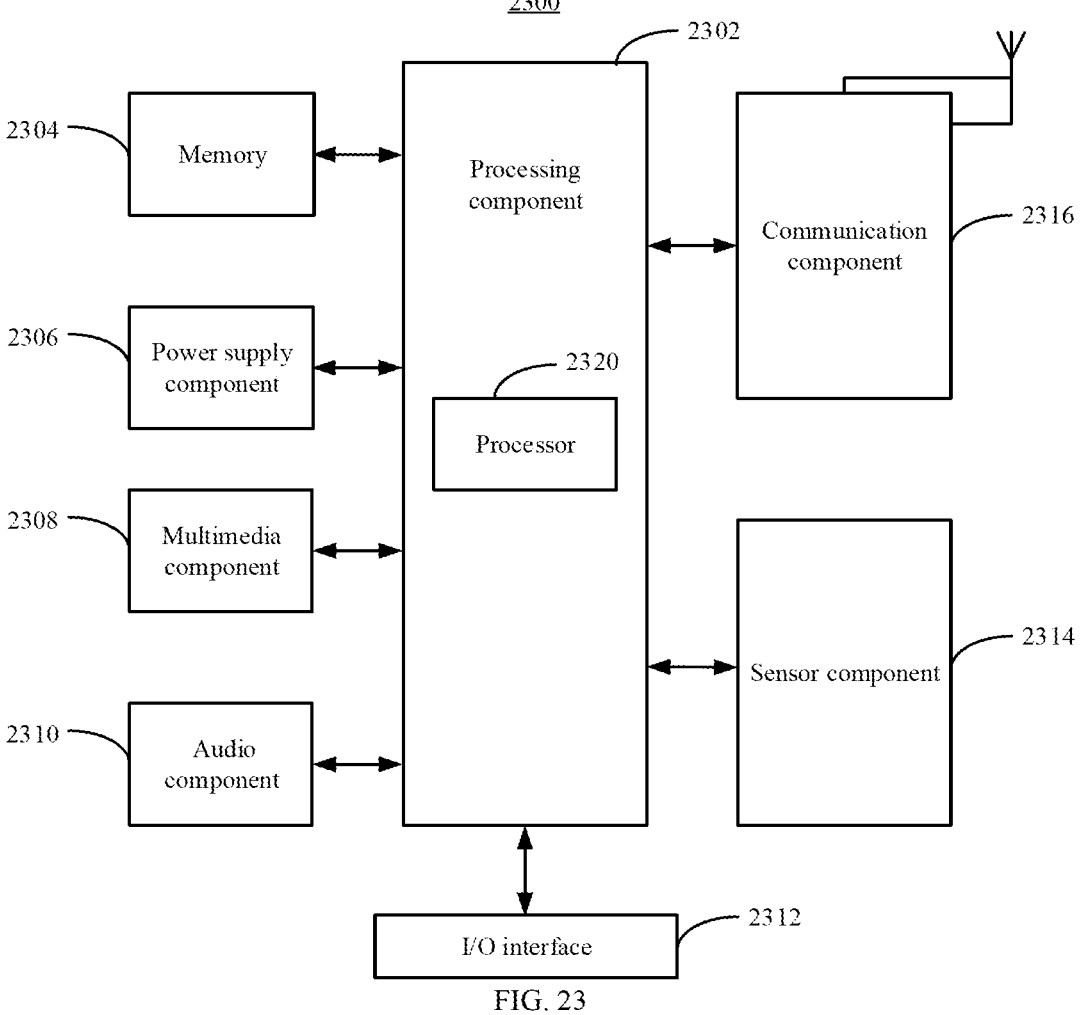
FIG. 23 is a schematic block diagram of an apparatus for monitoring and control illustrated according to some embodiments of the present disclosure.

FIG. 23 is a schematic block diagram of an apparatus 2300 for monitoring and control illustrated according to some embodiments of the present disclosure. For example, the apparatus 2300 may be a mobile phone, a computer, a digital broadcast terminal, a message transceiving device, a game console, a tablet device, a medical device, a fitness device, a personal digital assistant, etc.

Referring to FIG. 23, the apparatus 2300 may include one or more of the following components: a processing component 2302, a memory 2304, a power supply component 2306, a multimedia component 2308, an audio component 2310, an input/output (I/O) interface 2312, a sensor component 2314, and a communication component 2316.

The processing component 2302 generally controls the overall operation of the apparatus 2300, such as operations associated with display, telephone calls, data communications, camera operations, and recording operations. The processing component 2302 may include one or more processors 2320 to execute instructions to complete all or some of the steps of the foregoing method for monitoring and control. In addition, the processing component 2302 may include one or more modules that facilitate interaction between the processing component 2302 and other components. For example, the processing component 2302 may include a multimedia module to facilitate interaction between the multimedia component 2308 and the processing component 2302.

The memory 2304 is configured to store various types of data to support operations at the apparatus 2300. Examples of such data include instructions for any application or method used to be operated on apparatus 2300, contact data, phonebook data, messages, pictures, videos, and the like. The memory 2304 may be implemented by any type of volatile or non-volatile storage device or a combination of them, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic disk, or an optical disk.

The power supply component 2306 provides electrical power for various components of the apparatus 2300. The power supply component 2306 may include a power management system, one or more power sources, and other components associated with generating, managing, and allocating power for the apparatus 2300.

The multimedia component 2308 includes a screen providing an output interface between the apparatus 2300 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touching, sliding, and gestures on the touch panel. The touch sensor may not only sense a boundary of a touching or sliding action, but also detect a duration and pressure associated with the touching or sliding action. In some embodiments, the multimedia component 2308 includes a front-facing camera and/or a rear-facing camera. When the apparatus 2300 is in an operation mode, such as a photographing mode or a video mode, the front-facing camera and/or the rear-facing camera may receive external multimedia data. Each the front-facing camera or the rear-facing camera may be a fixed optical lens system or have a focal length and an optical zoom capability.

The audio component 2310 is configured to output and/or input an audio signal. For example, the audio component 2310 includes a microphone (MIC) configured to receive an external audio signal when the apparatus 2300 is in an operation mode, such as a call mode, a recording mode, and a speech recognition mode. The received audio signal may be further stored in the memory 2304 or sent via the communication component 2316. In some embodiments, the audio component 2310 further includes a speaker configured to output an audio signal.

The I/O interface 2312 provides an interface between the processing component 2302 and a peripheral interface module. The peripheral interface module may be a keyboard, a click wheel, a button, or the like. The button may include, but is not limited to, a home button, a volume button, an enable button, and a lock button.

The sensor component 2314 includes one or more sensors for providing status assessments of various aspects for the apparatus 2300. For example, the sensor component 2314 may detect the open/closed state of the apparatus 2300, and the relative positioning of the components, for example, the components are the display and the keypad of the apparatus 2300. The sensor component 2314 may also detect the position change of the apparatus 2300 or a component of the apparatus 2300, the presence or absence of contact between the user and the apparatus 2300, the orientation or acceleration/deceleration of the apparatus 2300, and the temperature change of the apparatus 2300. The sensor component 2314 may include a proximity sensor configured to detect the presence of nearby objects without any physical contact. The sensor component 2314 may also include an optical sensor, such as a CMOS or CCD image sensor, for use in an imaging application. In some embodiments, the sensor component 2314 may further include an acceleration sensor, a gyroscope sensor, a magnetic sensor, a pressure sensor, or a temperature sensor.

The communication component 2316 is configured to facilitate wired or wireless communication between the apparatus 2300 and other devices. The apparatus 2300 may access a wireless network based on any communication standard, such as WiFi, 2G or 3G, 4G LTE, 5 GNR, or a combination of them. In some embodiments, the communication component 2316 receives broadcast signals or broadcast related information from an external broadcast management system via a broadcast channel. In some embodiments, the communication component 2316 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the apparatus 2300 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic components, for performing the method for monitoring and control described above.

In some embodiments, there is further provided a non-transitory computer-readable storage medium including an instruction, such as a memory 2304 including an instruction. The instruction may be executed by the processor 2320 of the apparatus 2300 to complete the method for monitoring and control described above. For example, the non-transitory computer-readable storage medium may be a ROM, a random access memory (RAM), a CD-ROM, a magnetic tape, a floppy disk, an optical data storage device, etc.

According to a first aspect of the embodiments of the present disclosure, there is provided a control method, performed by a terminal, and the method includes:

receiving indication information from a base station, where the indication information is used for indicating that the base station enables a target control policy, and the target control policy is that the base station controls an uplink resource of the terminal within a target time window according to maximum duty cycle capability information of the terminal;

stopping monitoring an uplink duty cycle.

In some embodiments, the method further includes:

sending the maximum duty cycle capability information to the base station.

In some embodiments, sending the maximum duty cycle capability information to the base station includes:

sending the maximum duty cycle capability information to the base station in response to a current power level being higher than a level threshold.

In some embodiments, the method further includes:

receiving a valid time of the target control policy from the base station;

maintaining the current power level within the valid time;

monitoring the uplink duty cycle beyond the valid time; and performing power reduction in response to a monitored uplink duty cycle being greater than a duty cycle threshold corresponding to the maximum duty cycle capability information.

In some embodiments, the method further includes:

monitoring the uplink duty cycle in response to a current power level being higher than a level threshold and not receiving the indication information; and performing power reduction in response to a monitored uplink duty cycle being greater than a duty cycle threshold corresponding to the maximum duty cycle capability information.

In some embodiments, the method further includes:

reducing a value of power reduction in response to having performed power reduction.

In some embodiments, the method further includes:

sending at least one of following to the base station:

a power headroom report, a configured maximum user equipment output power, or a maximum allowed user equipment output power reduction.

According to a second aspect of the embodiments of the present disclosure, there is provided a control method, performed by a base station, and the method includes:

sending indication information to a terminal, where the indication information is used for indicating that the base station enables a target control policy, and the target control policy is that the base station controls an uplink resource of the terminal within a target time window according to maximum duty cycle capability information of the terminal.

In some embodiments, the method further includes:

determining a duty cycle threshold corresponding to the maximum duty cycle capability information of the terminal;

where the target control policy is that the base station controls the uplink resource of the terminal within the target time window, so that the uplink duty cycle of the terminal within the target time window is less than the duty cycle threshold.

In some embodiments, determining a duty cycle threshold corresponding to the maximum duty cycle capability information of the terminal includes:

determining the duty cycle threshold according to the maximum duty cycle capability information from the terminal; or determining the duty cycle threshold according to default maximum duty cycle capability information in response to not receiving the maximum duty cycle capability information from the terminal.

In some embodiments, the method further includes:

sending a valid time of the target control policy to the terminal.

In some embodiments, the method further includes:

receiving at least one of following from the terminal:

a power headroom report, a configured maximum user equipment output power, or a maximum allowed user equipment output power reduction.

In some embodiments, the method further includes:

enabling the target control policy in response to satisfying at least one of following:

the power headroom report being less than a power headroom threshold;

the configured maximum user equipment output power being greater than an output power threshold; or the maximum allowed user equipment output power reduction being greater than a reduction power threshold.

According to a third aspect of the embodiments of the present disclosure, there is provided a control apparatus, applied to a terminal, and the apparatus includes:

an indication receiving module, configured to receive indication information from a base station, where the indication information is used for indicating that the base station enables a target control policy, and the target control policy is that the base station controls an uplink resource of the terminal within a target time window according to maximum duty cycle capability information of the terminal;

a monitoring control module, configured to stop monitoring an uplink duty cycle.

According to a fourth aspect of the embodiments of the present disclosure, there is provided a control apparatus, applied to a base station, and the apparatus includes:

an indication sending module, configured to send indication information to a terminal, where the indication information is used for indicating that the base station enables a target control policy, and the target control policy is that the base station controls an uplink resource of the terminal within a target time window according to maximum duty cycle capability information of the terminal.

According to a fifth aspect of the embodiments of the present disclosure, there is provided a communication apparatus, including a processor and a memory, configured to store with an executable instruction by the processor. The processor is configured to execute the above control method.

According to a sixth aspect of the embodiments of the present disclosure, there is provided a communication apparatus, including a processor and a memory, configured to store with an executable instruction by the processor. The processor is configured to execute the above control method.

According to a seventh aspect of the embodiments of the present disclosure, there is provided a non-transitory computer-readable storage medium, configured to store with a computer program; when the program is executed by a processor, the steps in the above control method.

According to an eighth aspect of the embodiments of the present disclosure, there is provided a non-transitory computer-readable storage medium, configured to store with a computer program; when the program is executed by a processor, the steps in the above control method.

Other embodiments of the present disclosure will be apparent to those skilled in the art from consideration of the description and practice of the present disclosure. The present disclosure is intended to cover any variations, uses, or adaptations of the present disclosure following the general principles of the present disclosure and including common general knowledge or conventional technical means in the art not disclosed in the present disclosure. The description and embodiments are considered as examples, with a true scope and spirit of the present disclosure being indicated by the following claims.

It should be understood that the present disclosure is not limited to the exact construction that has been described above and illustrated in the accompanying drawings, and that various modifications and changes may be made without departing from the scope of the present disclosure. The scope of the present disclosure is limited by the appended claims.

It should be noted that, in this context, relational terms such as first and second are used to distinguish an entity or operation from another entity or operation, without necessarily requiring or implying that any such actual relationship or order exists between these entities or operations. The terms "comprising", "including", or any other variant of them are intended to cover a non-exclusive inclusion, such that a process, method, article, or apparatus that includes a series of elements not only includes those elements, but also includes other elements not explicitly listed, or further includes elements inherent to such a process, method, article, or apparatus. In the absence of more restrictions, for the element defined by the statement "including a . . . ", it does not exclude the presence of another same element in the process, method, article, or device that includes the element.

The above provides a detailed introduction to the method and apparatus provided in the embodiments of the present disclosure. Specific examples are used in the context to explain the principles and implementation manners of the present disclosure. The explanations of the above embodiments are used to help understand the methods and core concepts of the present disclosure. Meanwhile, for those of ordinary skill in the art, there may be changes in the specific implementation manners and application scope based on the concepts of the present disclosure. In summary, the content of the description should not be understood as a limitation of the present disclosure.

What is claimed is:

1. A control method, performed by a terminal, the method comprising:
   receiving indication information from a base station, wherein the indication information is used for indicating that the base station enables a target control policy, and the target control policy is that the base station controls an uplink resource of the terminal within a target time window according to maximum duty cycle capability information of the terminal; and
   stopping monitoring an uplink duty cycle.

2. The method according to claim 1, further comprising:
   sending the maximum duty cycle capability information to the base station.

3. The method according to claim 2, wherein sending the maximum duty cycle capability information to the base station comprises:
   sending the maximum duty cycle capability information to the base station in response to a current power level being higher than a level threshold.

4. The method according to claim 3, further comprising:
   receiving a valid time of the target control policy from the base station;
   maintaining the current power level within the valid time;
   monitoring the uplink duty cycle beyond the valid time; and
   performing power reduction in response to a monitored uplink duty cycle being greater than a duty cycle threshold corresponding to the maximum duty cycle capability information.

5. The method according to claim 1, further comprising:
   monitoring the uplink duty cycle in response to a current power level being higher than a level threshold and not receiving the indication information; and
   performing power reduction in response to a monitored uplink duty cycle being greater than a duty cycle threshold corresponding to the maximum duty cycle capability information.

6. The method according to claim 1, further comprising:
   reducing a value of power reduction in response to having performed power reduction.

7. The method according to claim 1, further comprising:
   sending at least one of following to the base station:
   a power headroom report, a configured maximum user equipment output power, or a maximum allowed user equipment output power reduction.

8. A control method, performed by a base station, the method comprising:
   sending indication information to a terminal, wherein the indication information is used for indicating that the base station enables a target control policy, and the target control policy is that the base station controls an uplink resource of the terminal within a target time window according to maximum duty cycle capability information of the terminal.

9. The method according to claim 8, further comprising:
   determining a duty cycle threshold corresponding to the maximum duty cycle capability information of the terminal;
   wherein the target control policy is that the base station controls the uplink resource of the terminal within the target time window, so that the uplink duty cycle of the terminal within the target time window is less than the duty cycle threshold.

10. The method according to claim 9, wherein determining a duty cycle threshold corresponding to the maximum duty cycle capability information of the terminal comprises at least one of:

determining the duty cycle threshold according to the maximum duty cycle capability information from the terminal; or determining the duty cycle threshold according to default maximum duty cycle capability information in response to not receiving the maximum duty cycle capability information from the terminal.

11. The method according to claim 8, further comprising:

sending a valid time of the target control policy to the terminal.

12. The method according to claim 8, further comprising:

receiving at least one of following from the terminal:

a power headroom report, a configured maximum user equipment output power, or a maximum allowed user equipment output power reduction.

13. The method of claim 12, further comprising:

enabling the target control policy in response to satisfying at least one of following:

the power headroom report being less than a power headroom threshold;

the configured maximum user equipment output power being greater than an output power threshold; or the maximum allowed user equipment output power reduction being greater than a reduction power threshold.

14. A communication apparatus, comprising:

a processor; and a memory, configured to store with a computer program;

wherein, when the computer program is executed by the processor, a control method is implemented, the method comprising:

receiving indication information from a base station, wherein the indication information is used for indicating that the base station enables a target control policy, and the target control policy is that the base station controls an uplink resource of the terminal within a target time window according to maximum duty cycle capability information of the terminal; and stopping monitoring an uplink duty cycle.

15. A communication apparatus, comprising:

a processor; and a memory, configured to store with a computer program;

wherein, when the computer program is executed by the processor, the control method according to claim 8 is implemented.

16. The communication apparatus according to claim 14, wherein the method further comprises:

sending the maximum duty cycle capability information to the base station in response to a current power level being higher than a level threshold.

17. The communication apparatus according to claim 16, wherein the method further comprises:

receiving a valid time of the target control policy from the base station;

maintaining the current power level within the valid time;

monitoring the uplink duty cycle beyond the valid time; and performing power reduction in response to a monitored uplink duty cycle being greater than a duty cycle threshold corresponding to the maximum duty cycle capability information.

18. The communication apparatus according to claim 14, wherein the method further comprises:

monitoring the uplink duty cycle in response to a current power level being higher than a level threshold and not receiving the indication information; and performing power reduction in response to a monitored uplink duty cycle being greater than a duty cycle threshold corresponding to the maximum duty cycle capability information.

19. The communication apparatus according to claim 14, wherein the method further comprises:

reducing a value of power reduction in response to having performed power reduction.

20. The communication apparatus according to claim 14, wherein the method further comprises:

sending at least one of following to the base station:

a power headroom report, a configured maximum user equipment output power, or a maximum allowed user equipment output power reduction.

* * * * *